United States Patent
Limber

(10) Patent No.: US 10,488,214 B2
(45) Date of Patent: Nov. 26, 2019

(54) METHOD, APPARATUS, AND COMPUTER PROGRAM PRODUCT FOR DYNAMIC LANE GUIDANCE

(71) Applicant: HERE Global B.V., Eindhoven (NL)

(72) Inventor: Michael Limber, San Marcos, CA (US)

(73) Assignee: HERE Global B.V., Eindhoven (NL)

( * ) Notice: Subject to any disclaimer, the term of this patent is extended or adjusted under 35 U.S.C. 154(b) by 209 days.

(21) Appl. No.: 15/635,640

(22) Filed: Jun. 28, 2017

(65) Prior Publication Data
US 2019/0003846 A1    Jan. 3, 2019

(51) Int. Cl.
*G01C 21/34* (2006.01)
*G08G 1/0968* (2006.01)
*G01C 21/36* (2006.01)

(52) U.S. Cl.
CPC ..... *G01C 21/3492* (2013.01); *G01C 21/3658* (2013.01); *G08G 1/096805* (2013.01)

(58) Field of Classification Search
USPC ......................................................... 701/533
See application file for complete search history.

(56) References Cited

U.S. PATENT DOCUMENTS

| | | |
|---|---|---|
| 6,700,505 B2 | 3/2004 | Yamashita et al. |
| 8,484,002 B2 | 7/2013 | Yang et al. |
| 8,600,654 B2 | 12/2013 | Kishikawa et al. |
| 2011/0054777 A1 | 3/2011 | Rossio et al. |
| 2013/0275033 A1 | 10/2013 | Bastiaensen et al. |
| 2013/0282264 A1 | 10/2013 | Bastiaensen et al. |

(Continued)

FOREIGN PATENT DOCUMENTS

| | | |
|---|---|---|
| CA | 2 993 766 A1 | 2/2017 |
| DE | 195 31 822 A1 | 4/1996 |

(Continued)

OTHER PUBLICATIONS

"Magellan®—RoadMate 5230T-LM 5" Touchscreen Vehicle GPS Navigator." [retrieved Sep. 27, 2017]. Retrieved from the Internet: <URL: http://www.carid.com/magellan/magellan-roadmate-gps-navigators-16070305.html>. (dated 2017) 6 pages.

(Continued)

*Primary Examiner* — Tyler D Paige
(74) *Attorney, Agent, or Firm* — Alston & Bird LLP

(57) ABSTRACT

A method is provided for gathering probe data and using the gathered data to establish traffic speeds for various paths through an intersection. Methods may include receiving probe data from a plurality of probes approaching an intersection along a common road segment; receiving probe data from the plurality of probes exiting the intersection along two or more different road segments; determining traffic speed for each path through the intersection from the common road segment based on the received probe data from the plurality of probes approaching the intersection along the common road segment and the received probe data from the plurality of probes exiting the intersection along two or more different road segments; and generating an indication of the traffic speed for each path through the intersection to be provided for display on a graphical representation of the intersection.

20 Claims, 7 Drawing Sheets

(56) References Cited

U.S. PATENT DOCUMENTS

| | | | | |
|---|---|---|---|---|
| 2014/0229106 A1* | 8/2014 | Ishikawa | ............ | G01C 21/3647 |
| | | | | 701/533 |
| 2014/0278052 A1 | 9/2014 | Slavin et al. | | |
| 2017/0032584 A1* | 2/2017 | Moran | .................... | G06Q 10/02 |
| 2018/0136902 A1* | 5/2018 | Feit | ......................... | G06F 3/167 |
| 2019/0003846 A1* | 1/2019 | Limber | .............. | G01C 21/3492 |

FOREIGN PATENT DOCUMENTS

| | | |
|---|---|---|
| DE | 10 2011 013855 A1 | 9/2012 |
| EP | 0 772 174 A1 | 5/1997 |
| EP | 2 775 262 A1 | 9/2014 |
| WO | WO-2009/074671 | 6/2009 |
| WO | WO 2012/089282 A1 | 7/2012 |
| WO | WO-2016/087905 | 6/2016 |

OTHER PUBLICATIONS

International Search Report and Written Opinion for Application No. PCT/IB2018/054673 dated Oct. 18, 2018, 14 pages.

* cited by examiner

METHOD, APPARATUS, AND COMPUTER PROGRAM PRODUCT FOR DYNAMIC LANE GUIDANCE

TECHNOLOGICAL FIELD

An example embodiment of the present invention relates to providing for presentation of a route between an origin and a destination, and more particularly, to providing for presentation of dynamic lane guidance along a route from an origin to a destination to graphically depict to a user the one or more appropriate travel lanes of a road segment for following the route.

BACKGROUND

Maps have been used for centuries for providing route geometry and geographical information, while routes have conventionally been planned by hand along paths defined by the maps. Conventional paper maps including static images of roadways and geographic features from a snapshot in history have given way to digital maps presented on computers and mobile devices, and navigation has been enhanced through the use of graphical user interfaces.

Digital maps and navigation can provide dynamic route guidance to users as they travel along a route. Further, dynamic map attributes such as route traffic, route conditions, and other dynamic map-related information may be provided to enhance the digital maps and facilitate navigation. Different map service providers along with different user interfaces (e.g., different mobile devices or different vehicle navigation systems) may result in non-uniform map and route guidance interfaces, which may not be intuitive or easily understood by a user, particularly one that is accustomed to a different type of map and navigation interface.

BRIEF SUMMARY

A method, apparatus, and computer program product are provided in accordance with an example embodiment for providing for presentation of dynamic lane guidance along a route from an origin to a destination to graphically depict to a user the one or more appropriate travel lanes of a road segment for following the route. Embodiments described herein may provide an apparatus including at least one processor and at least one memory including computer program code. The at least one memory and computer program code configured to, with the processor, cause the apparatus to at least: determine a route from an origin to a destination, where the route includes two or more road segments, each having a direction of travel toward the destination, and where at least one maneuver is required to transition from a first road segment of the two or more road segments and a second road segment of the two or more road segments; determine a number of travel lanes for each road segment of the two or more road segments in the direction of travel toward the destination; provide for presentation of a route guidance ribbon along the route, wherein: the route guidance ribbon is of a first width across a plurality of lanes of the first road segment in the direction of travel toward the destination in response to being at least a first distance from the maneuver between the first road segment and the second road segment; the route guidance ribbon tapers from the first width to a second width between the first distance from the maneuver and a second distance from the maneuver, wherein the second distance from the maneuver is less than the first distance from the maneuver, and wherein the second width is narrower than the first width and is across at least one lane fewer than the plurality of lanes across which the first width extends.

According to some embodiments, the first distance from the maneuver may be established based, at least in part, on at least one of: road segment speed limit; a speed of a vehicle following the route; an average traffic speed along the first segment; or an average traffic speed along the first segment between the first distance and the maneuver. A distance between the first distance maneuver and the second distance from the maneuver may be established based, at least in part, on at least one of: road segment speed limit; a speed of a vehicle following the route; an average traffic speed along the first segment; or an average traffic speed along the first segment between the first distance and the maneuver. A color of the ribbon or at least a portion thereof may be based, at least in part, on an average speed of traffic along travel lanes covered by the ribbon. The ribbon may be of the second width through the maneuver and widens to a third width on the second road segment in response to being a third distance from a next maneuver.

According to some embodiments, the apparatus may be caused to provide for presentation of a dynamic graphical indication of a narrowing of the ribbon in response to a vehicle traveling along the route approaching the first distance from the maneuver. The route guidance ribbon may taper from the second width to a third width between the second distance from the maneuver and a third distance from the maneuver, where the third distance from the maneuver is less than the second distance from the maneuver, and where the third width is narrower than the second width and is across at least one lane fewer than the plurality of lanes across which the second width extends.

Embodiments described herein may provide a method that includes: providing for presentation of a route including at least one maneuver along the route, where the route is indicated by a lane level route ribbon along the route and through the maneuver, where a portion of the route traversed ahead of the maneuver includes a plurality of lanes in a direction of travel of the route, and where traversing the maneuver along the route requires use of only a subset of the plurality of lanes in the direction of travel; determining a first distance from the maneuver at which point the lane level route ribbon is of a first width that spans only the subset of the plurality of lanes, determining a second distance from the maneuver at which point the lane level route ribbon is at a second width that spans all of the plurality of lanes, and providing for presentation of the lane level route ribbon along the route tapering from the second width at the second distance from the maneuver to the first width at the first distance from the maneuver.

According to some embodiments, the route approaching the maneuver is along a first road segment, where the second distance from the maneuver is established based, at least in part, on at least one of: a road segment speed limit; a speed of a vehicle following the route; an average traffic speed along the first road segment; or an average traffic speed along the first road segment between the second distance and the maneuver. A distance between the second maneuver and the first distance from the maneuver may be established based, at least in part, on at least one of: road segment speed limit; a speed of a vehicle following the route; an average traffic speed along the first road segment; or an average traffic speed along the first road segment between the second distance and the maneuver. A color of the ribbon or at least a portion thereof may be based, at least in part, on an average speed of traffic along travel lanes covered by the ribbon. The ribbon may be of the first width through the maneuver and widens to a third with on the second road segment in response to being a third distance from a next maneuver. Methods may include providing for presentation of a dynamic graphical indication of a narrowing of the ribbon in response to a vehicle traveling along the route approaching the second distance from the maneuver.

Embodiments may provide a computer program product including at least one non-transitory computer-readable storage medium having computer-executable program code instructions stored therein. The computer-executable program code portions may include program code instructions configured to: provide for presentation of a route or portion thereof, where the route from an origin to a destination is determined, and where the route includes two or more road segments, each having a direction of travel toward the destination, and where at least one maneuver is required to transition from a first road segment of the two or more road segments and a second road segment of the two or more road segments; provide for presentation of a route guidance ribbon along the route, wherein: the route guidance ribbon is of a first width across a plurality of lanes of the first road segment in the direction of travel toward the destination in response to being at least a first distance from the maneuver between the first road segment and the second road segment; the route guidance ribbon tapers from the first width to a second width between the first distance from the maneuver and a second distance from the maneuver, and wherein the second width is narrower than the first width and is across at least one lane fewer than the plurality of lanes across which the first width extends.

According to some embodiments, the first distance from the maneuver is established based, at least in part, on at least one of: road segment speed limit; a speed of a vehicle following the route; an average traffic speed along the first segment; or an average traffic speed along the first segment between the first distance and the maneuver. A distance between the first distance of the maneuver and the second distance from the maneuver may be established based, at least in part, on at least one of: road segment speed limit; a speed of a vehicle following the route; an average traffic speed along the first segment; or an average traffic speed along the first segment between the first distance from the maneuver and the maneuver. A color of the ribbon, or at least a portion thereof, may be based, at least in part, on an average speed of traffic along travel lanes covered by the ribbon.

According to some embodiments, the ribbon may be of the second width through the maneuver and widens to a third width on the second road segment in response to being a third distance from a next maneuver. Computer program products of example embodiments may include program code instructions to provide for presentation of a dynamic graphical indication of a narrowing of the ribbon in response to a vehicle traveling along the route approaching the first distance from the maneuver. The route guidance ribbon may taper from the second width to a third width between the second distance from the maneuver and a third distance from the maneuver, where the third distance from the maneuver is less than the second distance from the maneuver, and where the third width is narrower than the second width and is across at least one lane fewer than the plurality of lanes across which the second width extends.

Embodiments described herein may provide an apparatus including: means for providing for presentation of a route including at least one maneuver along the route, where the route is indicated by a lane level route ribbon along the route and through the maneuver, where a portion of the route traversed ahead of the maneuver includes a plurality of lanes in a direction of travel of the route, and where traversing the maneuver along the route requires use of only a subset of the plurality of lanes in the direction of travel; means for determining a first distance from the maneuver at which point the lane level route ribbon is of a first width that spans only the subset of the plurality of lanes, determining a second distance from the maneuver at which point the lane level route ribbon is at a second width that spans all of the plurality of lanes, and providing for presentation of the lane level route ribbon along the route tapering from the second width at the second distance from the maneuver to the first width at the first distance from the maneuver.

According to some embodiments, the route approaching the maneuver is along a first road segment, where the second distance from the maneuver is established based, at least in part, on at least one of: a road segment speed limit; a speed of a vehicle following the route; an average traffic speed along the first road segment; or an average traffic speed along the first road segment between the second distance and the maneuver. A distance between the second maneuver and the first distance from the maneuver may be established based, at least in part, on at least one of: road segment speed limit; a speed of a vehicle following the route; an average traffic speed along the first road segment; or an average traffic speed along the first road segment between the second distance and the maneuver. A color of the ribbon or at least a portion thereof may be based, at least in part, on an average speed of traffic along travel lanes covered by the ribbon. The ribbon may be of the first width through the maneuver and widens to a third with on the second road segment in response to being a third distance from a next maneuver. An example apparatus may include means for providing for presentation of a dynamic graphical indication of a narrowing of the ribbon in response to a vehicle traveling along the route approaching the second distance from the maneuver.

BRIEF DESCRIPTION OF THE DRAWINGS

Figure 1:
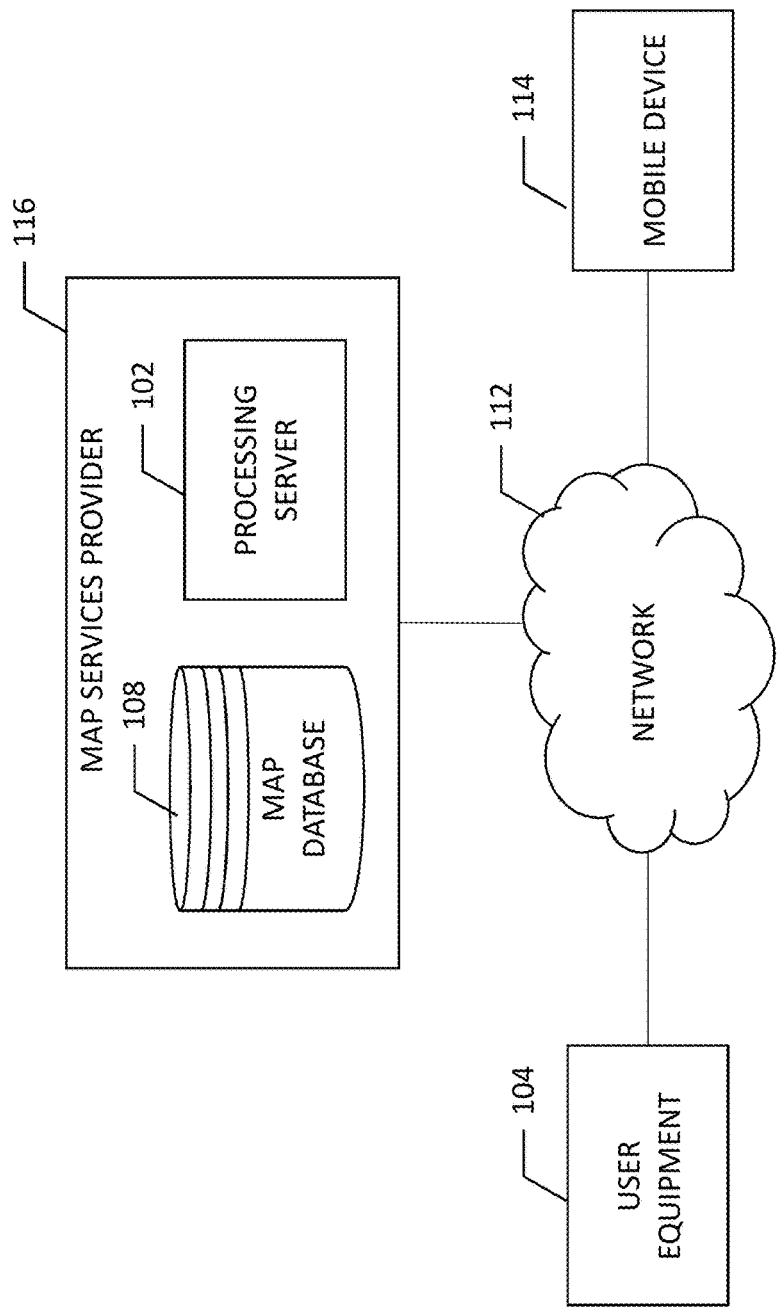
Figure 2:
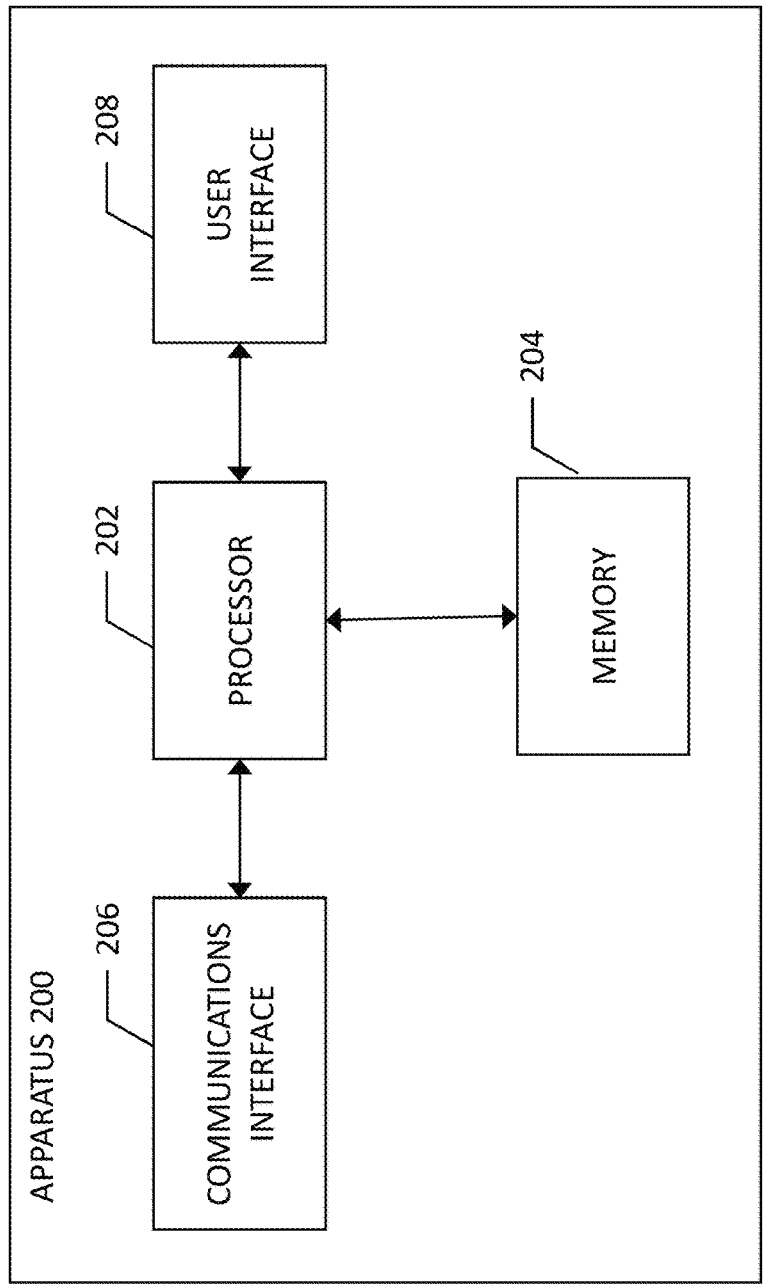
Figure 3:
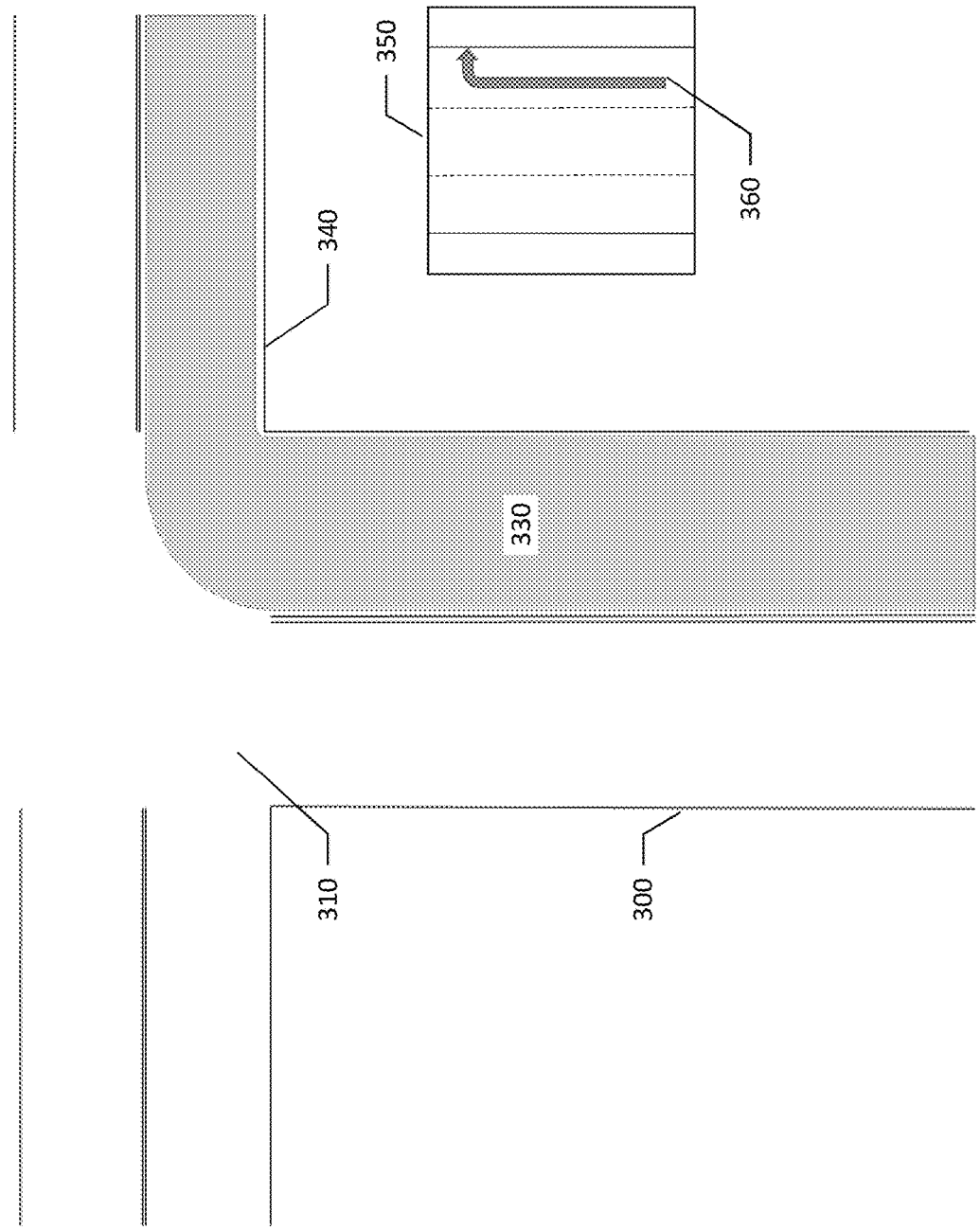
Figure 4:
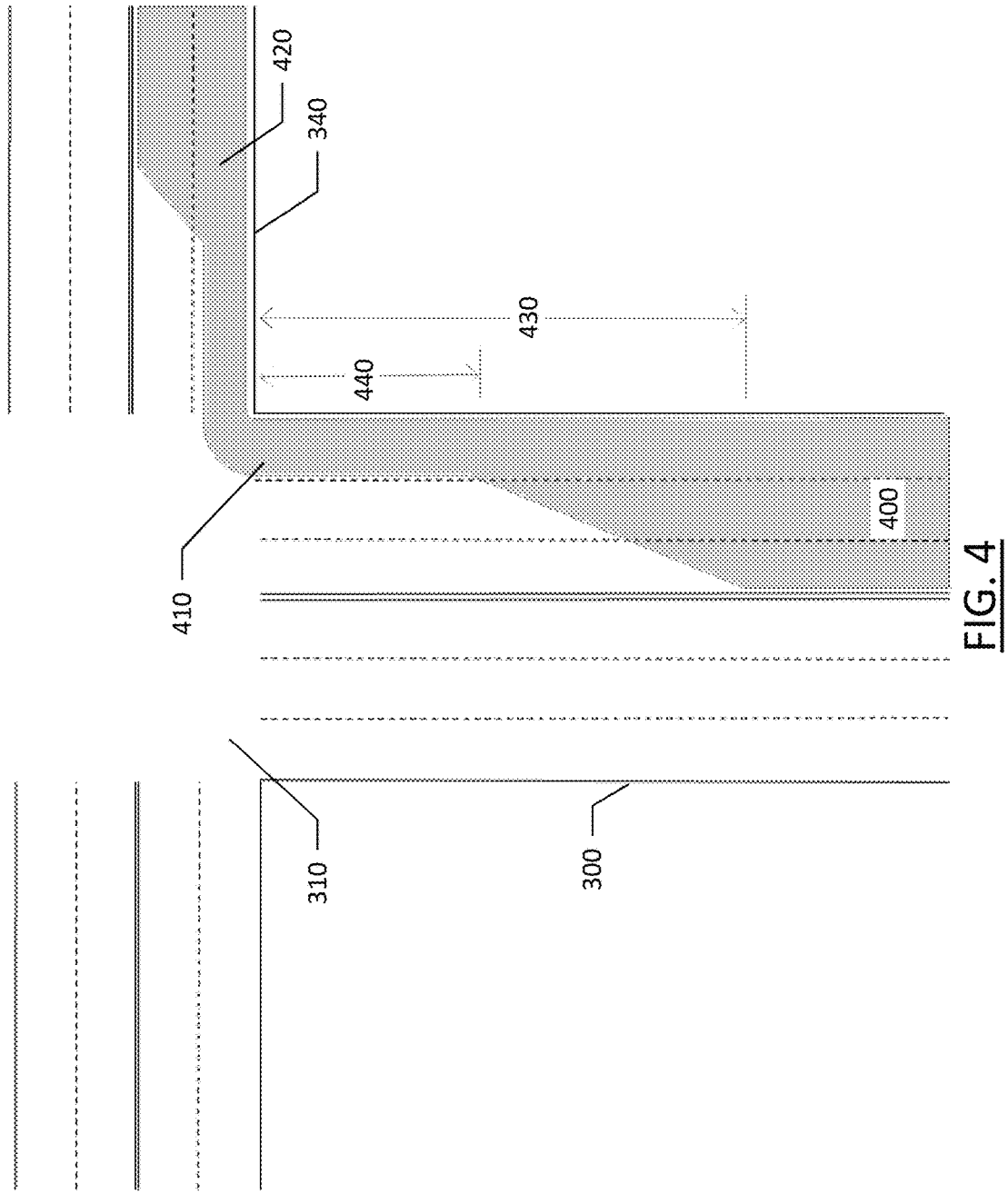
Figure 5:
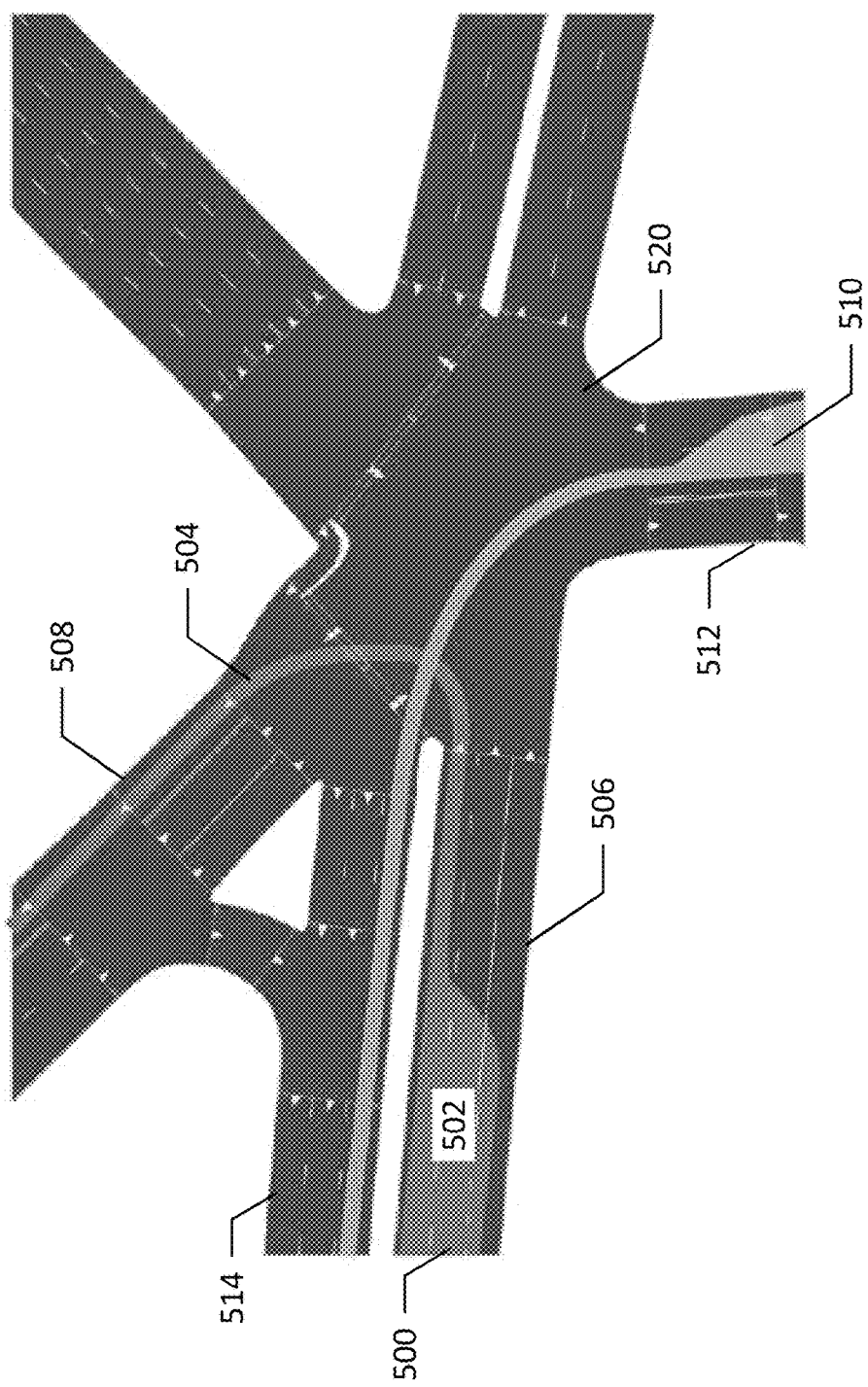
Figure 6:
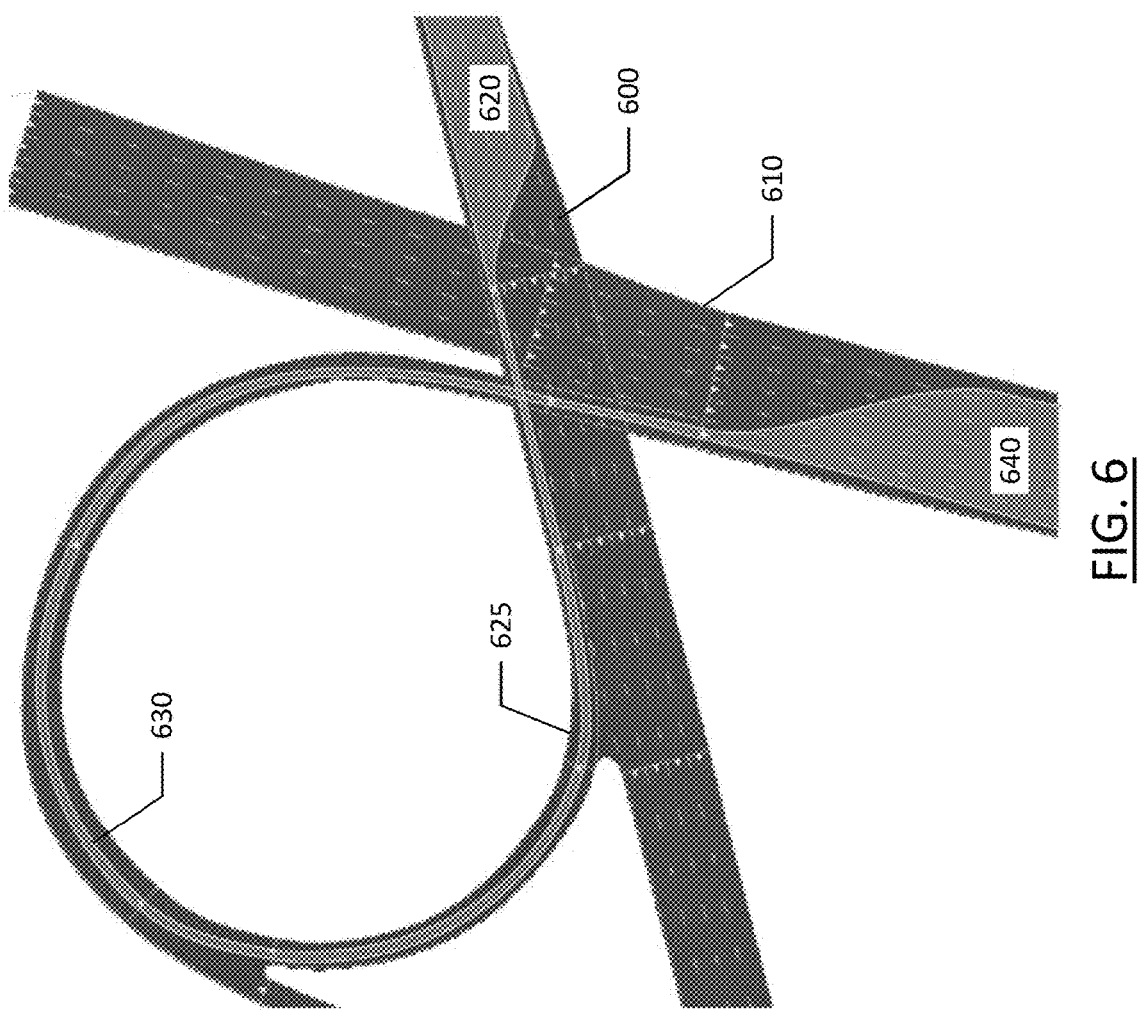
Figure 7:
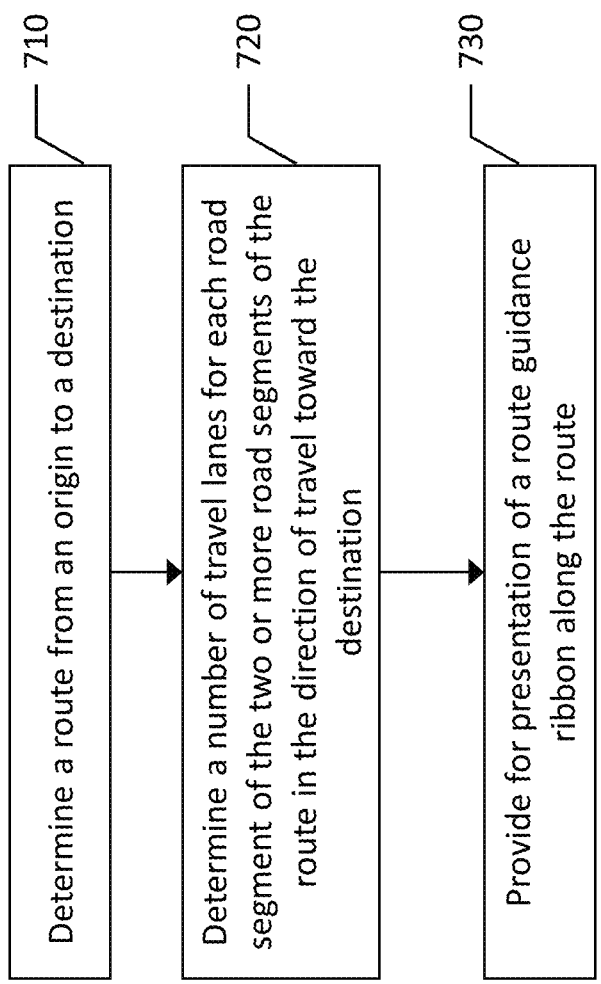

Having thus described example embodiments in general terms, reference will now be made to the accompanying drawings, which are not necessarily drawn to scale, and wherein:

FIG. 1 illustrates a communications diagram in accordance with an example embodiment described herein;

FIG. 2 is a block diagram of an apparatus that may be specifically configured for providing for presentation of dynamic lane guidance along a route in accordance with an example embodiment described herein;

FIG. 3 depicts route guidance along a route from a first road segment to a second road segment through maneuver in accordance with an example embodiment described herein;

FIG. 4 illustrates a dynamic lane level route guidance ribbon displayed along a first road segment, across a maneuver, and onto a second road segment with varying width according to an example embodiment described herein;

FIG. 5 illustrates a pair of dynamic lane level route guidance ribbons traversing an intersection along their respective routes according to an example embodiment described herein;

FIG. 6 illustrates a pair of dynamic lane level route guidance ribbons traversing an intersection along their respective routes according to another example embodiment described herein;

FIG. 7 is a flowchart for providing for presentation of dynamic lane level route guidance along a route according to an example embodiment described herein.

DETAILED DESCRIPTION

Example embodiments of the disclosure will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments described herein. Thus, use of any such terms should not be taken to limit the spirit and scope of the described embodiments.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

A system, method, apparatus, and computer program product are provided herein in accordance with an example embodiment for providing for presentation of dynamic lane guidance along a route from an origin to a destination to graphically depict to a user the one or more appropriate lanes of travel along a road segment for following the route. FIG. 1 illustrates a communication diagram of an example embodiment of a system for implementing example embodiments described herein. The illustrated embodiment of FIG. 1 includes a map services provider system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit (e.g., a mobile or fixed-in-vehicle unit), personal data assistant, watch, camera, or the like. Additionally or alternatively, the user equipment 104 may be a fixed computing device, such as a personal computer, computer workstation, kiosk, office terminal computer or system, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map services provider 116.

The map database 108 may include node data, road segment data or link data, point of interest (POI) data, or the like. The map database 108 may also include cartographic data, routing data, and/or maneuvering data where maneuvers are established as movements required to remain on a route, such as a turn. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

In an example embodiment, the geographic map database 108 may be presented according to a hierarchical or multi-level tile projection. More specifically, the geographic database may be defined according to a normalized Mercator projection or another type of projection. A map tile grid of a Mercator or similar projection may be a multilevel grid. Each cell or tile in a level of the map tile grid may be divisible into the same number of tiles of that same level of grid. In other words, the initial level of the map tile grid (e.g., a level at the lowest level of zoom) may be divisible into four cells or rectangles. Each of those cells may be, in turn, divisible into four cells, and so on until the highest level of zoom of the projection is reached.

According to an example embodiment, the map tile grid may be numbered in a systematic fashion to define a tile identifier (tile ID). For example, the top left tile may be numbered "00", the top right tile may be numbered "01", the bottom left tile may be numbered "10", and the bottom right tile may be numbered "11". In one embodiment, each cell may be divided into four rectangles and numbered by concatenating the parent tile ID and the new tile position. A variety of numbering schemes may also be possible. Any number of levels within increasingly smaller geographic areas may represent the map tile grid. Any level (n) of the map tile grid may have 2(n+1) cells. Accordingly, any tile of the level (n) has a geographic area of A/2(n+1), where A is the total geographic area of the world or the total area of the map tile grids. Using the aforementioned numbering system or a similar nomenclature, the exact position of any tile in any level of the map tile grid or projection may be uniquely determined from the tile ID.

According to some embodiments, the system may identify a tile by a quadkey determined based on the ID of a tile of the map tile grid. The quadkey, for example, may be a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeros may be inserted or retained regardless of the level of the map tile grid in order to maintain a constant length for the one-dimensional array of the quadkey. In another example, the length of the one-dimensional array of the quadkey may indicate the corresponding level within the map tile grid. In one embodiment, the quadkey may be an example of the hash or encoding scheme of the respective geographical coordinates of a geographical data point that can be used to identify a tile in which the geographic data point is located.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map services provider. For example, a customer of the map services provider, such as a navigation services provider or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example.

In certain embodiments, the end user device or user equipment 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 104 for navigation and map functions such as guidance and map display, for example, and for determination of one or more personalized routes or route segments based on one or more calculated and recorded routes, according to some example embodiments.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. The probe data may also include speed and direction in some embodiments, such as when probe data is used to facilitate vehicle traffic speed determination. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment for providing for presentation of dynamic lane guidance along a route from an origin to a destination to graphically depict to a user the one or more appropriate travel lanes of a road segment for following the route. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment. For example, the memory device could be configured to buffer input data for processing by the processor. Additionally or alternatively, the memory device could be configured to store instructions for execution by the processor.

As noted above, the apparatus 200 may be embodied by processing server 102. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an example embodiment on a single "system on a chip." As such, in some cases, a chip or chipset may constitute a means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an example embodiment while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an example embodiment by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

An example embodiment may provide a mechanism for presentation of dynamic lane guidance along a route from an origin to a destination to graphically depict to a user the one or more appropriate travel lanes of a road segment for following the route. Navigation systems which provide route guidance to a user often present a route from an origin to a destination as only a centerline of road segments that make up the route. This representation ignores the possibility of multiple lanes and fails to provide a granular lane-based route guidance to the user. To rectify this issue, a lane assistance graphic has been introduced in some navigation systems that presents a separate graphic indication of the number of lanes of travel and which lanes are appropriate for an upcoming maneuver along the route. This separate graphic widget may show a series of arrows representing the lane count of the current road segment and highlight the lanes that the navigation suggests for the route guidance. However, this method of lane travel indication requires a user to divert their eyes from the guidance to view a separate graphic. This requires a user, such as the driver of a vehicle, to view both the route guidance display and the separate lane assistance graphic to understand where they need to be to follow the route. This adds distraction and complicates a user interface.

Embodiments provided herein use a dynamic lane level route ribbon to provide dynamic lane guidance along a route. The dynamic lane level route ribbon integrates both the route and the lane assistance using the same visual element, thereby forgoing the need for a user to view two separate graphical elements to understand the route guidance and lane-level instruction. Using lane level road data from a map service provider database, a high definition road model of a road segment along which a user is traveling may be provided to clearly indicate to a user the appropriate route and the appropriate lane to follow the route. The dynamic lane level route ribbon is provided along a road segment that is part of the route during route guidance, and the width of the dynamic lane level route ribbon is varied to cover the lanes that a user may use to maintain the route. For example, during a relatively long period of highway driving, the dynamic lane level route ribbon may be sufficiently wide to cover all lanes of the highway, providing an indication to a user that all lanes may be used while still adhering to the route of the route guidance. As the user travels along the route and approaches a maneuver, such as an exit of the highway, the dynamic lane level route ribbon may narrow from the width covering all lanes, to a width covering only lanes that can be used to exit the highway at the maneuver. The rate at which the lane level route ribbon narrows from the width covering all lanes to the width covering only lanes used to exit the highway may be variable, and may depend on a number of factors, such as speed limit of a road segment, a speed of the user following the route, an average traffic speed along the road segment, or an average traffic speed along the road segment that is covered by the dynamic lane level route ribbon.

FIG. 3 illustrates an example embodiment of the prior art which may provide route guidance to a user. As illustrated, a first road segment 300 that intersects intersection 310 with another road. The depicted route indicator 330 merely indicates the road segment along which the generated route is directed, and turning from road segment 300 onto road segment 340. As shown, the route indicator 330 only indicates the road segment/direction for the route, but fails to convey lane-level indicators. However, the lane assistance graphic 350 provides an indication of the appropriate lane for the user to be in as they approach the intersection 310. As shown, the lane assistance graphic shows a route arrow 360 in the right-most of three lanes. The separate lane assistance graphic 350 and route indicator 330 provide a mechanism for conveying the appropriate lane for a user; however, the method is cumbersome and may require greater distraction from driving than is preferred.

FIG. 4 illustrates an example embodiment described herein which may minimize driver distraction while providing easily understood dynamic lane guidance along a route. The illustrated embodiment of FIG. 4 may be provided for display on, for example, user equipment 104 or mobile device 114 of FIG. 1, and user interface 208 of apparatus 200 of FIG. 2. Using a map database, such as map database 108 from map services provider 116 having lane-level distinction of road segments, route guidance can be provided using a dynamic lane level route ribbon to provide an indication of when a user should be in one or more specific lanes of the road segment. The embodiment of FIG. 4 depicts the first road segment 300, intersection 310, and the second road segment 340 of the route. The illustrated embodiment further includes a lane level route ribbon 400 that begins with a portion of the ribbon covering all three lanes of the first road segment 300 as the route approaches intersection 310. As the route guidance requires a maneuver (right turn) to stay on the route from the first road segment 300 to the second road segment 340, the maneuver requires the user to be in the right-most lane of the first road segment 300 as they reach intersection 310. The lane level route ribbon 400 reflects this need as the ribbon 400 narrows in width from the first width across all three lanes of the first road segment 300 down to a second width across only the right-most lane of the first road segment as shown at portion 410 of the ribbon 400. As the route traverses the maneuver, or in the instant case, the right turn onto the second road segment 340, the route ribbon remains the second width through the maneuver until widening out to a third width at section 420 of the ribbon 400. The widening of the ribbon at 420 across both lanes of travel of the second road segment 340 in the direction of the route indicates that the user may be in either lane while still adhering to the route.

As described with respect to FIG. 4, lane level route guidance is provided by a lane level route ribbon 400 that covers the lanes of travel in the direction of the route that a user may be in while still adhering to the route. This allows a user to view a single user interface graphical depiction of the route to understand where they need to be on a road segment and when they need to be there, doing away with the need for a separate lane assistance graphic 350 as shown in FIG. 3.

While the embodiment of FIG. 4 illustrates lane level route guidance using a ribbon ahead of a turn maneuver, lane level route guidance can be provided in any situation where it may be desirable to direct a user to one or more of a subset of lanes of a plurality of lanes of a road segment. For example, if traffic is slowing in the right-most lane due to an accident or traffic build-up at an exit, lane level route guidance may indicate to a user to use one or more other lanes by narrowing the lane level route ribbon to only include lanes of the road segment that do not have heavy traffic. Similarly, if there is road construction, a traffic accident, or debris in the roadway obstructing one or more lanes (which the map services provider may be informed of by municipal road networks, crowd-sourced information, emergency responder data, etc.), the lane level route ribbon may narrow to avoid the obstructed lanes.

In some circumstances it may be undesirable to abruptly narrow a lane level route ribbon from a plurality of lanes to a subset of the plurality of lanes such that the lane level route ribbon may more gradually taper from a first width covering a plurality of lanes to a second width covering a subset (e.g., one or more, but not all) of the plurality of lanes. The rate at which the lane level route ribbon tapers between the first width and the second width may be determined by a number of factors.

In an example embodiment, using the illustration of FIG. 4 for reference, a lane level route ribbon for a right turn from the first road segment 300 to the second road segment 340 may require a user to be in the right-most lane ahead of the turn maneuver 410 at a predetermined distance 440 from the maneuver based on traffic flowing at or about posted speed limits along the first road segment 300. The predetermined distance 440 from the maneuver within which the route requires one or more specific lanes to be used to adhere to the route may also be based on lane restrictions through traffic laws (e.g., requiring no lane changes within a predetermined distance of an intersection) or lane restrictions where solid lane lines indicate that no lane changes are to be made. The predetermined distance 430 may be established based on having to narrow the lane level route ribbon 400 from a first width across three lanes to a second width across one lane by the time it reaches predetermined distance 440 from the intersection such that the predetermined distance 430 will define the ribbon taper rate.

The rate of ribbon taper may be based on fixed predetermined distances, such as 100 feet before a maneuver the lane level route ribbon may narrow to the lanes needed to complete the maneuver, while the ribbon may begin the narrowing 500 feet before the maneuver. However, while the rate of ribbon taper may be fixed based on distances from a maneuver, the rate of ribbon taper may be influenced by a variety of factors that may alter the predetermined distances 430 and 440. Various factors may influence the predetermined distances 430, 440 and the rate of taper between the predetermined distances. For example, the rate of ribbon taper may be determined based, at least in part, by a speed of the user traveling along the route. For example, if a user is traveling at a relatively high speed, the rate of taper of the lane level route ribbon from a first width across a plurality of lanes to a second width across a subset of the plurality of lanes may be gradual to enable the user time to move from the one or more lanes that are ceasing to be spanned by the ribbon. A gradual narrowing may be, for example, one lane per 1,000 feet at 50 miles per hour (73 feet per second), or 500 feet at 30 miles per hour (44 feet per second). At a slower pace with mild to moderate traffic, the ribbon tapering may be over an even shorter distance. However, at a slower traffic pace, such as when a user is in heavy stop-and-go traffic, the ribbon narrowing may not correlate directly with vehicle speed and may be more gradual as it may be difficult to change lanes. In this manner, the rate of narrowing of the ribbon may be based on vehicle speed of a user traveling along the route, and may optionally be influenced by the level of traffic whether it is light, moderate, or heavy. Thus, the distance 440 may be established based on how long before the maneuver it is determined that the user following the route must be in the appropriate lane, while the predetermined distance 430 may be established based on a variety of other factors including traffic levels, speed, number of lanes that need to be narrowed, etc.

The rate of ribbon taper may optionally be determined based in part on the number of lanes that will be removed from the ribbon width ahead of the maneuver. If only one lane is removed from the lane level route ribbon before a maneuver, there may be less distance between a first predetermined distance where the ribbon taper begins and a second predetermined distance from the maneuver where the ribbon taper ends. As noted above, a "lane per distance unit" measure may be used to establish where the ribbon taper needs to begin ahead of a maneuver based on the contributing factors to the taper rate (e.g., vehicle speed, traffic, etc.).

The rate of ribbon taper may optionally be determined based on speeds other than that of a user traveling along the route. For example, the rate of ribbon taper may be based on the speed of traffic ahead of a user where the user has not yet slowed to that speed (or conversely, accelerated to that speed). The rate of ribbon taper may optionally be based on the posted speed limit for the road segment such that all routes through a particular maneuver would include the same dynamic lane level route ribbon. The rate of taper may optionally be based on at lease one lane level speed or traffic level and may be different between lanes. For example, three different lanes may have different speed or traffic levels associated with them such that the rate of change of the taper may be different as the taper passes through each respective lane. This may enable a user to visually distinguish when they have a reasonable amount of time or distance to change lanes versus when a more abrupt or faster lane change is appropriate based on the differences between the speeds and/or traffic in a particular lane.

Once a maneuver has been traversed, such as once the user has made the right turn 410 of the embodiment of FIG. 4, the route ribbon may widen to cover all lanes that are acceptable for use while adhering to the route. This widening may be more abrupt than the narrowing as it would be more acceptable to a driver to be notified as quickly as possible if they may use additional lanes while adhering to the route. Thus, there may exist a taper to the lane level route ribbon from the narrower width through the maneuver to the wider width beyond the maneuver, or optionally, the availability of other lanes may be a stepped transition with no taper indicating that the additional lanes are available immediately upon reaching that stepped transition. However, a widening rate may be used to indicate a safe rate at which a user may change lanes, such that a widening of the ribbon may be influenced by the factors described above with respect to the narrowing taper. Traffic speed, traffic levels, user vehicle speed, etc. may influence the rate of widening of the lane level route ribbon. Further, the location at which the ribbon begins to widen may be based on, for example, a safe distance past the maneuver. Upon traversing a maneuver through an intersection, it may be unsafe, undesirable, or possible against local traffic laws to change lanes such that the ribbon width may not widen until after a predetermined distance past the maneuver.

While FIG. 4 illustrates a relatively simple right-turn maneuver, embodiments may be implemented for any of a variety of maneuvers, from accident/traffic/obstruction avoidance, to complex compound turn maneuvers. FIG. 5 illustrates an example embodiment of a first lane level route ribbon 500 and a second lane level route ribbon 510 through intersection 520. As shown, ribbon 500 approaches intersection 520 at 502 having a first width across three lanes of the road segment 506 in the direction approaching the intersection 520. The ribbon 500 tapers from covering the three lanes at 502 to covering a single lane at a first distance from the intersection such that the left turn maneuver of the route can be completed. The ribbon 500 exits the intersection at 504 and maintains a one-lane width as road segment 508 has only one lane in the direction of travel of the route represented by ribbon 500. Ribbon 510 approaches intersection 520 along road segment 512 and narrows from covering two lanes to covering only a single lane to proceed along the left turn maneuver onto road segment 514. In the illustrated embodiment, ribbon 510 maintains a single lane width along road segment 514, which may be due to another upcoming maneuver, lane-level traffic information, or various other factors described above.

FIG. 6 illustrates an example embodiment of a lane level route ribbon for a highway route directing a vehicle from road segment 600 to road segment 610 around an exit. As with the example embodiment of FIG. 4, the illustrated embodiment of FIGS. 5 and 6 may be provided for display on, for example, user equipment 104 or mobile device 114 of FIG. 1, and user interface 208 of apparatus 200 of FIG. 2. As shown, the ribbon begins at a width across all lanes of the highway at 620 and tapers to a single lane that is able to access the exit ramp at a predetermined distance ahead of the exit ramp 625. The ribbon continues around the exit at a single-lane width at 630 before merging onto road segment 610. Upon merging onto road segment 610, the ribbon widens at 640 to cover all lanes of the highway indicating that any lane of highway road segment 610 are acceptable for adhering to the route.

As described herein, the dynamic lane level route ribbons can be used to convey information regarding both a route and a desirable lane for adhering to the route to a user through a single graphical interface element. Other information can optionally be conveyed through the route ribbons, such as traffic speed or preferred, but non-essential lane options. For example, a ribbon color can be used to indicate the speed of traffic along a route. This may be helpful to a driver approaching an area of slower traffic such that they are aware of the need to slow before seeing the vehicles ahead of them begin to slow. Further, embodiments may include ribbons having differing colors for different lanes covered by the ribbon. For example, while three lanes of a roadway may be acceptable for adhering to a route, the speed of traffic in the differing lanes may be different, and each lane may be represented by a color indicating the speed of the traffic (e.g., red for slow or stopped, yellow for moderate speeds, and green for at or near posted speed limits). This may provide a user with an indication of which lanes are desirable while also indicating which lanes are acceptable to adhere to the route.

FIG. 7 illustrated a flowchart depicting a method according to example embodiments. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an example embodiment described herein and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 7 illustrates a flowchart of a method according to an example embodiment. A route may be determined from an origin to a destination at 710, where the route includes two or more road segments, each having a direction of travel toward the destination, and at least one maneuver is required to transition from a first road segment of the two or more road segments to a second road segment of the two or more road segments. A number of travel lanes may be determined for each road segment of the two or more road segments in the direction of travel toward the destination at 720. A route guidance ribbon along the route may be provided for presentation at 730. The route guidance ribbon may be of a first width across a plurality of lanes of the first road segment in the direction of travel toward the destination in response to being at least a first distance from the maneuver between the first road segment and the second road segment. The route guidance ribbon may taper from the first width to a second width between the first distance from the maneuver and a second distance from the maneuver, where the second distance from the maneuver is less than the first distance from the maneuver. The second width may be narrower than the first width and may be across at least one lane fewer than the plurality of lanes across which the first width extends.

In an example embodiment, an apparatus for performing the methods of FIG. 7 above may comprise a processor (e.g., the processor 202) configured to perform some or each of the operations (710-730) described above. The processor may, for example, be configured to perform the operations (710-730) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 710-730 may comprise, for example, the processor 202 and/or a device or circuit for executing instructions or executing an algorithm for processing information as described above.

Many modifications and other embodiments set forth herein will come to mind to one skilled in the art to which these described embodiments pertain having the benefit of the teachings presented in the foregoing descriptions and the associated drawings. Therefore, it is to be understood that the example embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
   determine a route from an origin to a destination, wherein the route comprises two or more road segments, each having a direction of travel toward the destination, and wherein at least one maneuver is required to transition from a first road segment of the two or more road segments to a second road segment of the two or more road segments;
   determine a number of travel lanes for each road segment of the two or more road segments in the direction of travel toward the destination; and
   provide for presentation of a route guidance ribbon along the route on a display of a navigation device, wherein:
      the route guidance ribbon is of a first width across a plurality of lanes of the first road segment in the direction of travel toward the destination in response to being at least a first distance from the maneuver between the first road segment and the second road segment; and
      the route guidance ribbon tapers from the first width to a second width between the first distance from the maneuver and a second distance from the maneuver, wherein the second distance from the maneuver is less than the first distance from the maneuver, and wherein the second width is narrower than the first width and is across at least one lane fewer than the plurality of lanes across which the first width extends.

2. The apparatus of claim 1, wherein the first distance from the maneuver is established based, at least in part, on at least one of: road segment speed limit; a speed of a vehicle following the route; an average traffic speed along the first segment; or an average traffic speed along the first segment between the first distance and the maneuver.

3. The apparatus of claim 1, wherein a distance between the first distance maneuver and the second distance from the maneuver is established based, at least in part, on at least one of: road segment speed limit; a speed of a vehicle following the route; an average traffic speed along the first segment; or an average traffic speed along the first segment between the first distance and the maneuver.

4. The apparatus of claim 1, wherein a color of the ribbon or at least a portion thereof is based, at least in part, on an average speed of traffic along travel lanes covered by the ribbon.

5. The apparatus of claim 1, wherein the ribbon is of the second width through the maneuver and widens to a third width on the second road segment in response to being a third distance from a next maneuver.

6. The apparatus of claim 1, wherein the apparatus is further caused to:
   provide for presentation of a dynamic graphical indication of a narrowing of the ribbon in response to a vehicle traveling along the route approaching the first distance from the maneuver.

7. The apparatus of claim 1, wherein the route guidance ribbon tapers from the second width to a third width between the second distance from the maneuver and a third distance from the maneuver, wherein the third distance from the maneuver is less than the second distance from the maneuver, and wherein the third width is narrower than the second width and is across at least one lane fewer than the plurality of lanes across which the second width extends.

8. A method for operating a navigation device comprising:
   providing for presentation on a display of the navigation device of a route including at least one maneuver along the route, wherein the route is indicated by a lane level route ribbon along the route and through the maneuver, wherein a portion of the route traversed ahead of the maneuver comprises a plurality of lanes in a direction of travel of the route, and wherein traversing the maneuver along the route requires use of only a subset of the plurality of lanes in the direction of travel of the route;
   determining, by a processor, a first distance from the maneuver at which point the lane level route ribbon is of a first width that spans only the subset of the plurality of lanes;
   determining, by the processor, a second distance from the maneuver at which point the lane level route ribbon is at a second width that spans all of the plurality of lanes; and
   providing for presentation on the display of the lane level route ribbon along the route tapering from the second width at the second distance from the maneuver to the first width at the first distance from the maneuver.

9. The method of claim 8, wherein the route approaching the maneuver is along a first road segment, wherein the second distance from the maneuver is established based, at least in part, on at least one of: road segment speed limit; a speed of a vehicle following the route; an average traffic speed along the first road segment; or an average traffic speed along the first road segment between the second distance and the maneuver.

10. The method of claim 9, wherein a distance between the second distance maneuver and the first second distance from the maneuver is established based, at least in part, on at least one of: road segment speed limit; a speed of a vehicle following the route; an average traffic speed along the first road segment; or an average traffic speed along the first road segment between the second distance and the maneuver.

11. The method of claim 8, wherein a color of the ribbon or at least a portion thereof is based, at least in part, on an average speed of traffic along travel lanes covered by the ribbon.

12. The method of claim 8, wherein the ribbon is of the first width through the maneuver and widens to a third width on the second road segment in response to being a third distance from a next maneuver.

13. The method of claim 8, further comprising:
   providing for presentation of a dynamic graphical indication of a narrowing of the ribbon in response to a vehicle traveling along the route approaching the second distance from the maneuver.

14. A computer program product comprising at least one non-transitory computer-readable storage medium having computer-executable program code portions stored therein, the computer-executable program code portions comprising program code instructions configured to:

provide for presentation on a display of a navigation device of a route or portion thereof, wherein the route from an origin to a destination is determined, and wherein the route comprises two or more road segments, each having a direction of travel toward the destination, and wherein at least one maneuver is required to transition from a first road segment of the two or more road segments to a second road segment of the two or more road segments;

provide for presentation on the display of a plurality of travel lanes for each road segment as part of the presentation of the route, wherein the plurality of travel lanes of the two or more road segments is established in the direction of travel toward the destination; and provide for presentation on the display of a route guidance ribbon along the route, wherein:

the route guidance ribbon is of a first width across a plurality of lanes of the first road segment in the direction of travel toward the destination in response to being at least a first distance from the maneuver between the first road segment and the second road segment; and the route guidance ribbon tapers from the first width to a second width between the first distance from the maneuver and a second distance from the maneuver, and wherein the second width is narrower than the first width and is across at least one lane fewer than the plurality of lanes across which the first width extends.

15. The computer program product of claim 14, wherein the first distance from the maneuver is established based, at least in part, on at least one of: road segment speed limit; a speed of a vehicle following the route; an average traffic speed along the first segment; or an average traffic speed along the first segment between the first distance and the maneuver.

16. The computer program product of claim 14, wherein a distance between the first distance maneuver and the second distance from the maneuver is established based, at least in part, on at least one of: road segment speed limit; a speed of a vehicle following the route; an average traffic speed along the first segment; or an average traffic speed along the first segment between the first distance and the maneuver.

17. The computer program product of claim 14, wherein a color of the ribbon or at least a portion thereof is based, at least in part, on an average speed of traffic along travel lanes covered by the ribbon.

18. The computer program product of claim 14, wherein the ribbon is of the second width through the maneuver and widens to a third width on the second road segment in response to being a third distance from a next maneuver.

19. The computer program product of claim 14, further comprising program code instructions to:

provide for presentation of a dynamic graphical indication of a narrowing of the ribbon in response to a vehicle traveling along the route approaching the first distance from the maneuver.

20. The computer program product of claim 14, wherein the route guidance ribbon tapers from the second width to a third width between the second distance from the maneuver and a third distance from the maneuver, wherein the third distance from the maneuver is less than the second distance from the maneuver, and wherein the third width is narrower that the second width and is across at least one lane fewer than the plurality of lanes across which the second width extends.

* * * * *